United States Patent Office 2,982,786
Patented May 2, 1961

2,982,786

NOVEL CYCLIC DIMERS OF PERFLUOROVINYL ETHERS

Donald Irwin McCane, Claymont, Del., assignor to E. I. du Pont de Nemours and Company, Wilmington, Del., a corporation of Delaware No Drawing. Filed July 9, 1958, Ser. No. 747,352

6 Claims. (Cl. 260—611)

The present invention relates to novel fluorinated cyclic compounds, and more particularly to cyclic derivatives of alkyl perfluorovinyl ethers.

It has been well-established that fluorinated compounds are highly useful gases, liquids and solids due to their inertness and ability to withstand high temperatures. However, only a very limited number of fluorine compounds are commercially available since these compounds are generally difficult and costly to prepare. The present invention resulted from research directed towards the discovery of compounds which possess outstanding solvent powers as well as high temperature resistance and stability, and which can be readily, and therefore economically, prepared.

It is therefore an objective of the present invention to prepare fluorinated solvents. It is another objective of the present invention to prepare highly fluorinated liquids which are stable over a wide range of temperatures. Other objectives will become apparent hereinafter.

In accordance with the present invention there is provided a new class of fluorinated cyclic compounds having the formula $C_4F_6(OR)_2$, where R is an alkyl group or a fluoroalkyl group. Structurally the compounds of the present invention are compounds containing a perfluorocyclobutane ring to which two alkoxy groups or fluoroalkoxy groups are attached, said alkoxy groups being attached to adjacent carbon atoms.

The alkoxy-perfluorocyclobutanes and fluoroalkoxy perfluorocyclobutanes of the present invention are prepared by the dimerization of the corresponding perfluorovinyl ether. The cyclic dimerization of the alkyl perfluorovinyl ethers is achieved by heating the alkyl perfluorovinyl ethers under autogenous pressure at temperatures from 100° to 350° C. in the absence of compounds which cause the polymerization of the alkyl perfluorovinyl ethers. The reaction is suitably carried out in the presence of a polymerization stabilizer.

The alkyl perfluorovinyl ethers used in the present invention are preferably those having from 1 to 5 carbon atoms in the alkoxy radical. Examples of the alkyl- and fluoroalkyl perfluorovinyl ethers are methyl perfluorovinyl ether, ethyl perfluorovinyl ether, n-propyl perfluorovinyl ether, n-butyl perfluorovinyl ether, trifluoromethyl perfluorovinyl ether, and 2,2,2-trifluoroethyl perfluorovinyl ether. The alkyl perfluorovinyl ethers are prepared by the reaction of the alkali metal alcoholate of the alcohol corresponding to the alkoxy group in the ether with tetrafluoroethylene. The reaction may be illustrated by the following equation:

$$RONa + CF_2=CF_2 \rightarrow ROCF=CF_2 + NaF$$

It is not necessary that the alkali metal alcoholate be isolated, the reaction may be carried out by reacting the alcohol with a sodium dispersion in an organic solvent and then adding tetrafluoroethylene to the resulting reaction mixture. However, great care should be taken that no hydroxyl hydrogen or other active hydrogen remains in the reaction system when the tetrafluoroethylene is added; otherwise, the saturated ether, $ROCF_2$—$CF_2H$, is formed.

The fluorinated alkyl ethers may be prepared by the reaction of fluorinated alcoholates with tetrafluoroethylene or by the fluorination of 2-alkoxy propionic acids followed by the decarboxylation and defluorination of the sodium salt of the perfluorinated 2-alkoxy propionic acid which leads to the formation of the perfluorinated alkyl vinyl ether.

The preparation of the alkyl perfluorovinyl ethers is illustrated by the following experimental procedure.

Into a glass vessel was charged 18.5 g. of n-butyl alcohol dissolved in 150 ml. of sodium dried dioxane. An excess of the theoretical amount of sodium in the form of a 50% dispersion in xylene was added with stirring under nitrogen over a period of 4 hours. The mixture was allowed to stir for an additional 12 hours and then was charged into a 320 ml. stainless steel bomb. The bomb was sealed, pressured to 300 p.s.i. with tetrafluoroethylene, and heated to 85 to 90° C. under agitation. The bomb was repressured with tetrafluoroethylene as was necessary to maintain the pressure. The reaction was continued for approximately 2 hours, until no further decrease in pressure occurred. On removal from the cooled reaction vessel, the reaction mixture was treated with n-butyl alcohol to destroy any excess sodium present. The reaction mixture was filtered and the filtrate was distilled. There was obtained 10.1 g. of pure n-butyl perfluorovinyl ether.

The present invention is further illustrated by the following examples.

*Example I*

Into a thick-walled Pyrex combustion tube was charged under nitrogen 20 g. of n-propyl trifluorovinyl ether. The tube was then heated in a combustion furnace at 110° C. for 15 hours. The resulting cooled liquid product was distilled through a 12 inch spinning band column. A liquid product having a boiling point at 58.5 to 59.5° C. at 10 mm. was isolated. This product gave a negative test for unsaturation with potassium permanganate. The yield of the product was 5 g. An infrared spectrograph of a sample of this product revealed the complete disappearance of the 5.46 micron band found in the vinyl ether. Nuclear magnetic resonance analysis indicated that the structure of the compound was consistent with the 1,2-di(n-propoxy)perfluorocyclobutane.

*Analysis.*—Calculated for $C_{10}H_{14}O_2F_6$: C, 42.85; H, 5.04; F, 40.68; M.W., 280. Found: C, 41.9; H, 4.9; 5.1; F, 40.0; M.W., 290.

*Example II*

Using the procedure of Example I, 20.5 g. of n-butyl perfluorovinyl ether was dimerized. There was obtained on work-up of the product 12.0 g. of starting material and 4.4 g. of the dimer of n-butyl perfluorovinyl ether. The 1,2-di(n-butoxy)perfluorocyclobutane was found to have a boiling point at 44° C. at a pressure of 2 mm. The density of the liquid was 1.19. The refractive index of the liquid was measured to be 1.3713 at 25° C.

*Analysis.*—Calculated for $C_{12}H_{18}O_2F_6$: C, 46.75; H, 5.88; F, 36.98; M.W., 308. Found: C, 45.4; H, 5.7; F, 35.8; M.W., 304.

*Example III*

Into each of 4 Carius tubes was charged under nitrogen 50 g. of methyl trifluorovinyl ether, 0.5 g. of phenothiazine and 6 drops of "Terpene B," a commercially available polymerization inhibitor comprising terpene hydrocarbons. The sealed tubes were heated to 150° C. for 12 hours. Distillation of the combined products gave 166 g. (83%) of 1,2-(dimethoxy) perfluorocyclobutane having a boiling point at 119–121° C. at atmospheric pressure.

*Example IV*

Employing the procedure of Example I, 14.0 g. of 2,2,2-trifluoroethyl perfluorovinyl ether was dimerized in the presence of 0.2 g. of phenothiazine and 6 drops of "Terpene B." There was obtained on work-up of the reaction mixture 7.6 g. of starting material and 5 g. of 1,2-di(2′,2′,2′-trifluoroethoxy) perfluorocyclobutane having a boiling point at 156 to 157° C., a refractive index at 25° C. of about 1.3185 and a density of 1.68 g./cm.$^3$.

The examples hereinabove have illustrated the preparation of the 1,2-di(alkoxy)perfluorocyclobutanes of the present invention. The 1,2-di(alkoxy)perfluorocyclobutanes of the present invention may exist as cis- and trans-isomers. However, since isomers are difficult to separate and have the same properties, it is customary to consider the isomers as a single compound.

Various modifications of the process for the preparation of these compounds will occur to those skilled in the art. Thus, although not essential, the 1,2-di(alkoxy)perfluorocyclobutanes may be prepared in the presence of a solvent. In general, it is greatly preferred to prepare the 1,2-di(alkoxy)perfluorocyclobutane in the presence of known polymerization inhibitors, since the alkyl perfluorovinyl ethers have a great tendency to polymerize to linear polymers in the presence of even the smallest quantities of oxygen.

The 1,2-di(alkoxy)perfluorocyclobutanes of the present invention possess outstanding high temperature stability. They may be heated at 500 to 600° C. for long periods of time without decomposition. These compounds are therefore exceedingly useful as heat transfer media. These solvents may further be used as hydraulic fluids and lubricants, particularly at elevated temperatures. Due to their cyclic and ether structure, the 1,2-di(alkoxy)perfluorocryclobutane are also highly useful solvents for fluorinated and unfluorinated compounds. The compounds of the present invention may be further employed as chemical intermediates.

I claim:

1. A 1,2-di(alkoxy)perfluorocyclobutane having the formula

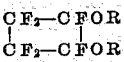

where R is a member of the class consisting of alkyl and fluoroalkyl radicals.
2. 1,2-di(methoxy)perfluorocyclobutane.
3. 1,2,-di(2′,2′,2′-trifluoroethoxy)perfluorocyclobutane.
4. 1,2-di(n-propoxy)perfluorocyclobutane.
5. 1,2-di(n-butoxy)perfluorocyclobutane.
6. The process for preparing 1,2-di(alkoxy)perfluorocyclobutane which comprises heating in an inert atmosphere and in the absence of a polymerization initiator, an alkyl perfluorovinyl ether having the formula $CF_2=CFOR$ wherein R is a member of the class consisting of alkyl and fluoroalkyl radicals, to a temperature of 100 to 350° C.

References Cited in the file of this patent

Coffman et al.: Jour. Amer. Chem. Soc., vol. 71 (1949), pages 490–96 (7 pages).
Barr et al.: Jour. Amer. Chem. Soc., vol. 72 (1950), pages 4480–82 (3 pages).